June 16, 1942.　　I. M. TERWILLIGER　　2,286,242
OPTICAL IMAGE SYSTEM
Filed Aug. 29, 1938　　2 Sheets—Sheet 1
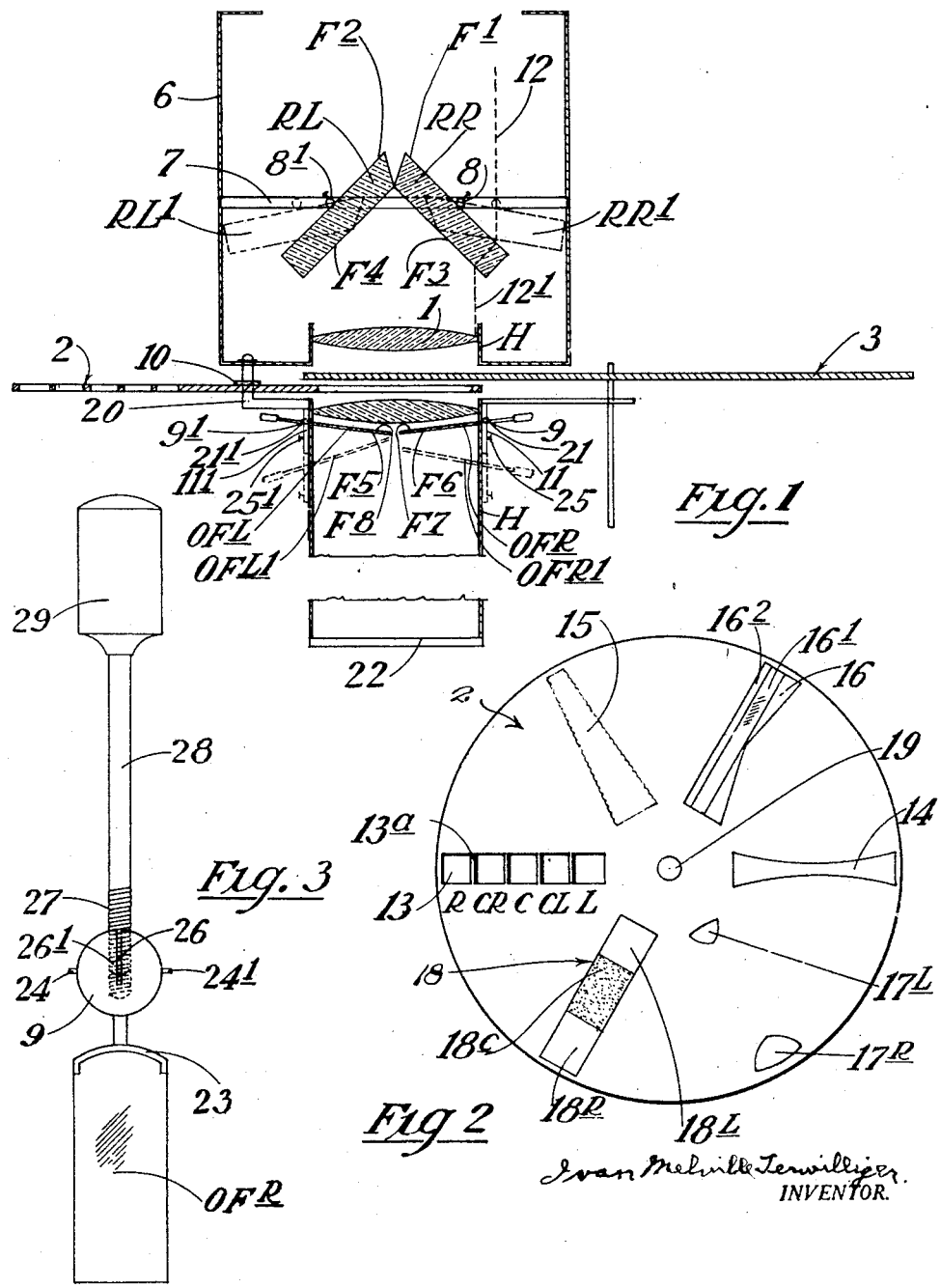

June 16, 1942.    I. M. TERWILLIGER    2,286,242
OPTICAL IMAGE SYSTEM
Filed Aug. 29, 1938    2 Sheets-Sheet 2
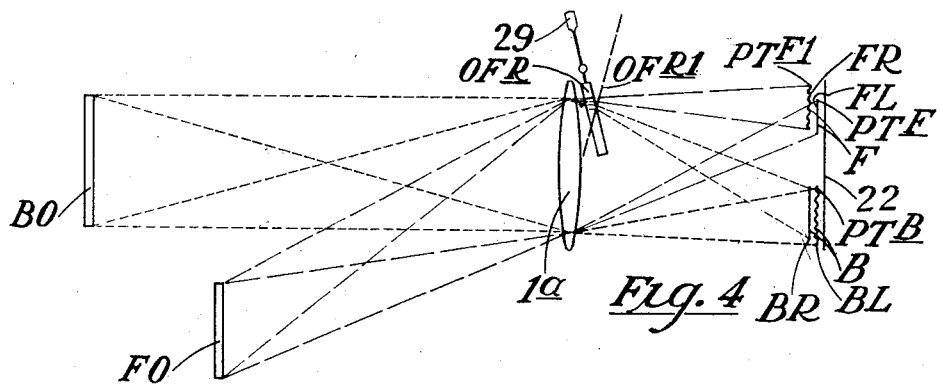
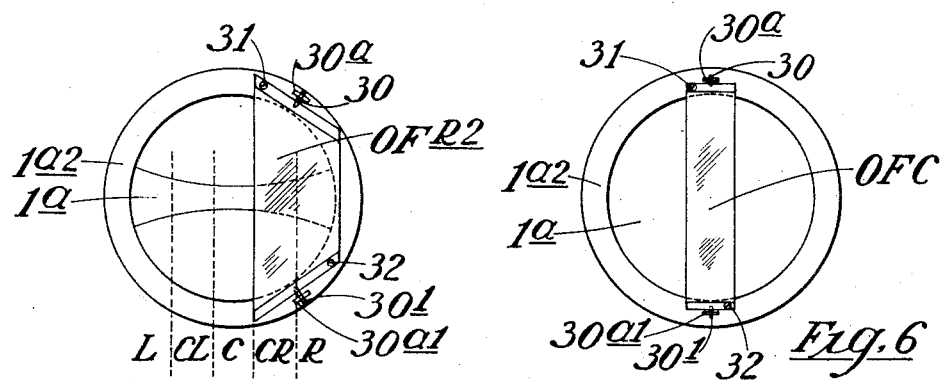
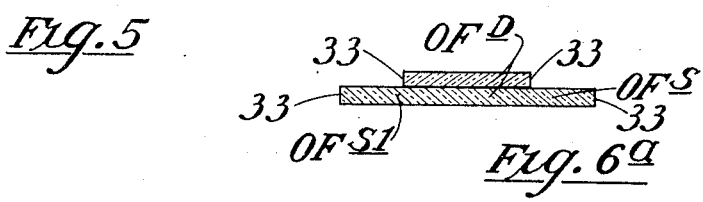
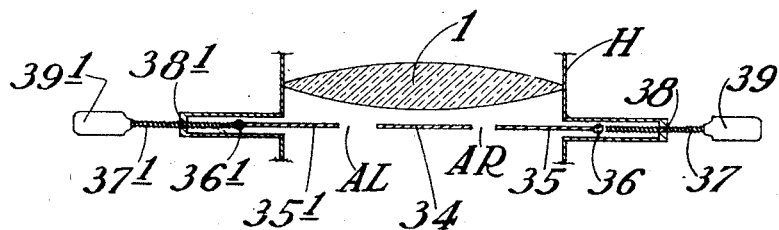
Ivan Melville Terwilliger,
INVENTOR.

Patented June 16, 1942

2,286,242

UNITED STATES PATENT OFFICE 2,286,242

OPTICAL IMAGE SYSTEM

Ivan Melville Terwilliger, Altadena, Calif.

Application August 29, 1938, Serial No. 227,282

18 Claims. (Cl. 88—16)

My invention relates to an optical image system for the production of optical images having new characteristics of structure and harmonious combinations of image elements upon a flat reception area for the illusion of plastic relief, and has particular reference to an optical image system employing a novel arrangement of optical elements finding particular utility when employed in a camera for the purpose of combining a plurality of individual images in harmonious combinations upon a photograph film to provide a picture giving an illusion of plastic relief.

This application is a continuation in part of my copending application Serial No. 183,696, filed January 6, 1938, entitled "Steropattern film strip in cinematography" and my copending application Serial No. 194,296, filed March 7, 1938, entitled "Art producing optical image modulations for relief effects in pictures."

The aforementioned copending applications are directed to a new and novel method of producing the illusion of plastic relief in both still and motion picture photography. The present invention is directed to improved devices for use in carrying out the methods disclosed in the aforementioned copending applications.

It is accordingly an object of my invention to provide an optical image system including optical elements for superimposing upon an image reception area a plurality of local image figures substantially identical in form in laterally directed mis-registration one to the other.

It is also an object of my invention to provide an optical image system of the character set forth which includes means for adjusting the degree of mis-registration of the individual image elements.

It is also an object of my invention to provide in a system of the character set forth in the preceding paragraphs an adjusting means providing for the establishment of superimposed image elements taken from divergent sight viewpoints.

It is a further object of my invention to provide in a system of the character set forth in the preceding paragraphs a means for adjusting the lateral disposition of sight viewpoints over a range greater than the maximum diameter of the lens employed.

It is an additional object of my invention to provide in an image system of the character set forth in the preceding paragraph a plural-focal objective having portions of different effective focal lengths to produce an image on an image reception area which is compounded of image figures including critically focused images of objects disposed different distances from said objective.

It is also an object of my invention to provide in an image system of the character set forth in the preceding paragraph a plural-focal optical device having differing foci identified, respectively, with laterally dissimilar viewpoints of a scene, together with means for adjusting the focal length of each of the optical elements to produce a local image on an image reception area which is compounded of a plurality of local image figures substantially identical in form, superimposed in laterally directed mis-registration one to each other and each in its own different focus.

It is also an object of my invention to provide in a system of the character set forth in the preceding paragraph a means for selectively controlling the registration of local component image elements at any depth plane of a spaced scene independent of the plane of critical focus of the system.

It is a further object of my invention to provide an aperture stop system for use with an optical image system of the character set forth hereinbefore which transmits light in differing amounts proportionate to the intensities in which it is desired to superimpose the separate image elements.

It is also an object of my invention to provide an aperture stop system of the character set forth in the preceding paragraph for transmitting different amounts of light in respect to laterally spaced viewpoints of a scene.

Other objects and advantages of my invention will be apparent from a study of the following specifications, read in connection with the accompanying drawings, wherein:

Fig. 1 is a schematic representation of the preferred form of my optical image system illustrating in section the various optical elements employed and their disposition relative to each other;

Fig. 2 is an elevational view of an aperture stop device illustrating the various types of aperture stops which may be employed in my system;

Fig. 3 is an enlarged detail showing an adjustable mounting which may be employed with the optical elements illustrated in Fig. 1;

Fig. 4 is a simplified diagrammatic representation of the system of my invention illustrating the manner in which the various image elements are superimposed and the manner in which the adjustable mounting illustrated in Fig. 3 may be employed to control the registration of the images;

Fig. 5 is an elevational view illustrating a modified form of adjustble mounting for one of the optical elements;

Fig. 6 is a view similar to Fig. 5 illustrating another alternative form of mounting;

Fig. 6a is a cross sectional view of one form of refracting element which may be employed in the system of my invention; and Fig. 7 is a diagrammatic view similar to Fig. 1 illustrating in section an alternative type of aperture stop system.

Referring now particularly to Fig. 1, H is the lens mount housing of any optical image apparatus commonly used. 22 is an image reception area in any well known relationship to the lens mount. IA is a rearward element of any commonly used lens objective. I is a forward element of any commonly used objective of common axis. 20 is an arm, bearing an aperture stop carrier 2. Aperture stop carrier 2 is rotatable between the lens elements bringing any selected aperture stop into position transverse the objective, where it may be then held fixed by the pin 10. 6 is a fixed shadow box housing frame attached to the extension of arm 20. 7 is a concave track or long socket extending across between opposite sides of the housing frame 6 and below the field of view of the lens I.

Upon track 7 are mounted relatively thick refractors, RL and RR, having plane opposite faces, $F^1$, $F^2$, $F^3$ and $F^4$, respectively. The refractors RL and RR are adjustable on and along the track 7 by ball and expansion screw elements 8 and $8^1$, by which means they are individually and manually adjustable in lateral position toward the center or toward the sides, and in angle of obliqueness before respective portions of area of the lens I. It will be obvious that the refractor pair can be set in position of contact with each other, at their inner edges, approximately on the optical axis of the objective. Or they can be separated by being slid farther apart along the track 7 or brought into any desired diverse positions and angles most desirable for the particular scene. For instance, $RL^1$ is a dotted line indicating an alternate position, out of many such, into which refractor RL is readily adjustable. And $RR^1$ is a dotted line indicating a corresponding position, out of many such, into which refractor RR is readily adjustable. In such instance the faces of the refractor RR are directed uniformly to an angle oblique relative to the plane of the objective. Effective areas of the refractor faces are in space separation from adjacent optical elements. $OF^L$ and $OF^R$ are relatively thin refractors, having plane opposite faces, $F^5$, $F^6$ and $F^7$, $F^8$, respectively. Refractors $OF^L$ and $OF^R$ are mounted attached, at one side only, to ball and pin, with expansion screw elements 9 and $9^1$, as appears in more detail in Fig. 3. The ball and pin elements 9 and $9^1$ are adjustable in sockets 21 and $21^1$.

Sockets 21 and $21^1$ are themselves, in turn, attached to mount strips II and $II^1$, which strips slide backward and forward in the respective sides of the lens mount as they may be adjusted by the screws 25 and $25^1$.

3 is a shutter element positioned adjacent to aperture stop carrier 2 positioned between the lens elements I and IA, and operatable in any manner well known, or as disclosed in my co-pending application U. S. Serial No. 194,296. As stated in that application, the shutter may, optionally, be postioned before or behind the lens, if desired.

$OF^{L1}$ is a dotted line indicating an alternate position, out of many, into which refractor $OF^L$ is readily adjustable.

$OF^{R1}$ is a dotted line indicating an alternate position, out of many, into which refractor $OF^R$ is readily adjustable.

The refractors RL and RR, and $OF^R$ and $OF^L$ are individually of plano-plano form in cross section.

The advance positioned refractors RL and RR preferably have a thickness relative to the thickness of the rearward positioned refractors $OF^L$ and $OF^R$ such that the rearward refractors may be set, if desired, to compensate exactly, on a selected depth plane in respect to registration of the image elements respectively transmitted, for the offset of the elements otherwise resulting from action of the forward refractors.

The action of the forward refractors is to offset light rays inwardly before the lens. By such means a light ray 12 from objective space, which corresponds to a sight viewpoint outside the limits of the lens I, is refracted and set over before the lens into position $12^1$ whereby it is passed into the lens, being otherwise unaltered in form, although somewhat reduced in intensity, and retaining its original direction of propagation. Thus ray 12 is parallel with ray $12^1$. And the virtual spread between right and left sight viewpoint position areas of the objective has been increased. For this work the refractor is superior to other means, such as a mirror, because a mirror frequently gets out of alignment in being adjusted, and such defect destroys accurate superposition of image, while the refractor at all times maintains all rays transmitted parallel to their original individual directions of propagation independent of increase or decrease in adjustment of the element. A refractor is superior further in being capable of positioning to produce images of the figures of the scene in a structure more harmonious.

It will also be seen that the totality of rays set over inwardly by action of the forward refractors are compressed thereafter and focused by normal action of the lens before reaching the position of the rearward refractors. Rays corresponding to the image elements are of smaller dimensions rearward of the lens. Accordingly the lineal measurement of correction in offset required to produce registration control rearward of the lens is appreciably less than the lineal measurement between ray positions 12 and $12^1$ in advance of the lens. The rearward refractors $OF^R$ and $OF^L$ are, therefore, made somewhat thinner than are the forward refractors RL and RR, being made only sufficiently thick to afford the offset required to re-establish registration of the images. For example the thickness of $OF^R$ may be as little as one sixty-fourth part of an inch or more or less; while the thickness of RL may be an inch or more or less.

Refractors RL and RR are thus, in effect, viewpoint spreaders, while refractors $OF^R$ and $OF^L$ are registration control means.

If the refractors RL and RR are in alternate positions $RR^1$ and $RL^1$ an image element is additionally passed through the center of the lens in normal unshifted condition. Of the lateral viewpoints may be further expanded by adding an additional refractor pair respectively in front of the refractors RR and RL.

In use of optical means to produce a picture of a scene in roundness and relief, it requires a greater separation of viewpoints to reproduce roundness in scenery that is at considerable distance from the lens. While lesser viewpoint separation is adequate for objects close up to the lens. The present apparatus is readily adjustable for all kinds of photography. For a distance photograph the refractors RR and RL may be placed at an angle of maximum obliqueness, offsetting the viewpoints to a great extent. And the right image element brought to any desired degree of registration with the left image element on the image reception area, by means of the registration control elements $OF^L$ and $OF^R$. While for a close up the refractors RR and RL may be swung along the track so that either, or both of them are entirely out of position before the lens 1 and light rays enter the lens directly and normally.

To eliminate distortion and light reflections the dead ends and sides of the refractors are opaque. Unwanted components of the picture rays are likewise themselves cancelled out by selective means of special diaphragms or aperture stops, by which means light interference is masked off at top and bottom of the aperture area, and the picture is passed at the objective plane through an aperture system preponderantly elongated in lateral dimension.

To facilitate selection and placement of desired aperture stops a plurality of such openings are made in an aperture carrier element 2, such as appears in Fig. 2. Carrier disk 2 is opaque except for the openings shown.

It is rotatable, at the opening 19, on the arm 20, to bring any desired selection of aperture system into position at the objective where it is then held fixed by the pin 10. Ordinarily in mounting the zonal aperture disk 2 athwart the optical axis it is positioned on or approximate to the nodal point of the lens. This is for a reason that the preferred aperture stop is desired to mask off unwanted portions of confusion rays, and suppress them at the lens position, while in no material degree reducing or masking off any section, such as top or bottom, as a section, out of the scene to mutilate the picture. It is preferred, also, to maintain all the color values to be passed through all the positions on and along the longitudinal extent of the aperture system.

On the disk carrier 2 is positioned aperture system 13, comprised of a multiplicity of laterally positioned openings. The openings are interspersed with opaque strips 13ª, blanking off corresponding lens zones so that rays are passed through only at a multiplicity of spaced lens areas.

In other cases it is desired to distribute a uniform amount of light onto the reception area equally from side and center positions of the lens, while using a lens of greater diameter, which normally passes more light through the center portion of the lens, and less light through a side or peripheral portion of equal area. I have therefore to adequately compensate for such condition provided zonal aperture 14 in a contour formation and area narrower at the middle, corresponding to a sight viewpoint approximating the lens center, and progressively increasing in width toward each side, equilaterally. Aperture 14 is in form preponderantly elongated in horizontal direction, when in operative position, at the objective. It is obviously desirable to provide for light stops of differing power to afford proper selection for photographing scenes under various conditions of natural light. For this I have provided alternate zonal aperture 16, which passes materially lesser light than zonal aperture 14, while equalizing the images uniformly from all the sight viewpoints after the manner of zonal aperture 14, when set to function in such manner. When so positioned at the objective, aperture stop 16 is on its lower portion of a contour passing more light at the lateral sides. The top is however straight across, and is fitted with a lid 16¹, which is an opaque strip movable in a groove, so that it can be slid farther down over the aperture 16 closing it down when photographing under light conditions of great brilliance. The lid 16¹ is of a height less than the height of the zonal aperture 16. It may be slid down clear into the middle of the zonal aperture 16, thereby dividing the zonal aperture 16, into two compartments, horizontally. Or it may be slid to contact the bottom of the aperture 16 at its middle section only, dividing aperture 16 into three compartments. Or the lid 16¹ may be slid farther down thus increasing the proportionate vertical width of the center of the aperture, while decreasing the proportionate width of the sides of the aperture. Or it may be slid clear to the bottom of the aperture zone 16, closing off the bottom and opening the top, making the zonal aperture rectangular in form. The lid 16¹ therefore performs two functions. It controls the amount of light passed through the zonal aperture 16. And it is a means regulating the relative ratio of light intensity between center and sides of the zonal aperture 16.

Zonal aperture 15 is another form out of many possible modifications of contour, and is characterised by having, when in operative position before the lens, the side of the sight area adjacent to the shutter shaft in a narrower width than the farther side of the sight area.

Now I have discovered that a most pleasing effect of roundness is produced on the structure of the images by proper use of a pair of spaced apertures positioned at opposite periphery areas of the lens when one of said aperture pair passes a substantially greater amount of light than the other member. The action of such combination produces at the image reception area a predominating image respecting the viewpoint of the scene corresponding to the greater aperture, and modification of the image structure is introduced by addition thereto of a secondary image in a recessive lesser, or threshold, intensity. The secondary intensity image corresponds to a laterally spaced viewpoint of the common scene. And by proper focusing, or by adjustment of registration control means such as the refractor $OF^R$, the recessive image is slightly offset from the dominant image, and produces an optical image element combination of enhanced roundness.

I accordingly provide aperture system of this nature in the openings 17$^R$ and 17$^L$, in which 17$^R$ is materially larger than 17$^L$, and in which both are capable of positioning simultaneously transverse the objective in respective positions.

I have also found that a pleasing effect is obtainable by an aperture stop of the style shown in opening 18, in which 18$^R$ and 18$^L$ are clear openings, with an intermediary light reduction element 18$^C$ at the intermediary position.

Any one of these aperture systems properly positioned at the objective and utilized in proper manner with the system, produces an accentuation in the apparent spaced depth of the scene. Individual images are by action of the combination produced in a structure consisting of umbra and penumbra, and having a vignetting, or light diminution in longitudinal direction predominantly, along at least one contour of the object image.

And when to this effect is added the mixture of image element structure produced by the refractors, or by the addition of the pluralfocal characteristic, then the result becomes striking The rearward refractors OF$^R$ and OF$^L$ are adjustable in angular position of obliqueness as to their faces relative to the objective. And it is possible to regulate the angle desired by computation relative to angle of divergence from the optical axis of the lens. As stated, the refractors have plane opposite faces. Each face individually is plane throughout its area in geometric form. And the faces are preferably parallel, the forward face relative to the rear face in each refractor individually. In which case both faces of the refractor are simultaneously in the same angle of obliqueness. Each of the rearward refractors, individually, is positioned rearward of a limited portion of the effective lens area, and simultaneously rearward of a limited portion of the effective area of the aperture system, and in spaced relationship rearward. Each refractor is individually adjustable.

Referring now to Fig. 3, I have shown a detail of mounting of refractor, OF$^R$, by which the refractor is mounted in a holder 23 which is attached to a sort of expansion ball 9. Extending from the ball 9, top and bottom oppositely and in a plane which is parallel with the faces of the refractor, are pins 24 and 24$^1$. In the section of the ball opposite the refractor is a slit 26 and a round hole 26$^1$ having internal screw threads. The recess of the hole is narrower progressively toward the interior of the ball. In the hole 26$^1$ is a screw 27 having a relatively long arm 28 and ending in an adjustment handle 29. In operation the cleft ball is inserted in its socket or mount on the slide 21 with the pins 24 and 24$^1$ inserted in proper recesses in the mount thereby maintaining ball and refractor in a vertical plane of approximately 90 degrees relative to the optical axis at all times, while permitting ball with refractor to swing freely in a horizontal plane as it may be moved by handle 29. Handle 29 is placed relatively farther from the pin 24 than is the refractor OF$^R$. A movement of handle 29 forward or backward changes the refractor by a lineal amount considerably less. The operator is thus able to look at the optical image while setting the position of the refractor and determining registration of the image elements, and to position refractor OF$^R$ in exact desired angular position effecting desired registration by moving the handle 29 forward or backward. When the desired adjustment has been made the handle 29 is turned, screwing the thread 27 firmly into the recess 26$^1$. This expands the ball 9 tightly in its socket and holds the refractor fixed in position. While the housing remains lightproof due to the rotundity of the ball in all positions of the refractor.

While I have shown in Fig. 1 the optical combination as mounting two diversely directed refractors rearward of the lens, and have shown the refractors as adjustable individually whereby they may be on occasion brought into contact approximating the optical axis of the lens, these refractors OF$^R$ and OF$^L$ are individually demountable whereby the other elements of the device may be used with either one or both removed. Use of the refractors according to my system may best be understood by analysis of the action of a refractor, such as OF$^R$, upon the optical image structure. Fig. 4 is a diagram illustrating a possible form of image structure concurrently produced on the image reception area by action of the objective and refractor element indicated. The dotted lines show the paths of light rays emanating from a background object BO and passing respectively through opposite sides of the optical system onto the image reception area. The dash lines show the paths of light rays emanating from a foreground object FO and passing respectively through the same opposite sides of the optical system. The rays passed through the left side of the objective element, for illustration 1$^a$, are transmitted onto the reception area in normal form. And, for purpose of illustration, this portion of the lens having no rearward refractor is understood to be adjusted in critical focus on foreground object FO. It accordingly transmits a sharply defined foreground image element FL of the foreground object onto the reception area. While the same portion of lens area transmits simultaneously a more laterally diffused background image element BL of the background object BO in its respective position on the reception area.

However, on the right side of the objective element 1$^a$ the rays passed at that area are additionally passed through the refractor OF$^R$. And refractor OF$^R$ shortens the effective focal length of that portion of the objective element, by such an amount that an image BR of the background object BO is caused to be in critical focus. The rays passed through the refractor OF$^R$, in addition to the lens, are by such combination of optical elements recombined on the reception area as image element BR, which is by action of the refractor OF$^R$ converted into sharp definition. The refractor OF$^R$ has the additional effect of producing an image FR of the foreground object FO which is converted into more soft definition. In the superposition of image elements FR and FL the foreground object FO is created in a relief effect contour combination, having a sharp contour image element to which has been added a more diffused image element, which may be laterally offset, creating a relief effect shadow. Refractor OF$^R$ not only shortens the focal length, but, through the degree of obliqueness at which its faces are positioned relative to the plane of the objective, affords additionally a control means regulating the lateral registration of the superposed image elements by deflecting the transmitted rays to increased or decreased extent. The refracting power of OF$^R$ is uniform throughout its entire effective area.

The lines of the illustration indicating image elements are separated for clarity only. The image elements are, in fact, superposed and mingled in a common plane at the reception area 22.

The operator manipulates the handle 29 while observing the optical image, and brings, for instance, the image element BR into exact registration with the image element BL at the point PT$^B$. This creates an enhanced misregistration between image elements FR and FL and creates an increased umbra-penumbra structure selectively of the foreground image F, which structure is substantially absent from the background image B. Adjustment of the refractor OF$^R$, however, into diverse angular position as indicated by dashed lines OF$^{R1}$ brings corresponding points PT$^F$ and PT$^{F1}$ of the foreground images FL and FR into exact registration, while creating an offset between the components BR and BL of the background image.

It will be seen that my present optical system, in this manner, separates the natural scene into a plurality of distinct image elements and affords means of selective depth plane registration control in their superposition at the reception area. When used with the most suitable aperture stop for the particular type of effect desired, the image structure is novel and striking in appearance. And by accurate arrangement of the elements of the apparatus it is possible to photograph a scene in a great number of different special effects.

If refractors OF$^R$ and OF$^L$ are used as a pair simultaneously, and if they are positioned in substantial contact on their edges approximating the optical axis of the lens, as already indicated, in angular position one to the other, the scene is brought back to a single critical focus. At the same time there is caused to exist, by reason of the angular position of the refractors, while passing light through and offsetting separate portions of the rays in opposite directions, a lateral misregistration or offset between, for example, image element FR and image element FL, while both are in uniform critical focus. My apparatus is additionally capable of establishing this offset in amount that is increased or decreased under easy adjustment of the operator as he controls, and sets the relative angle between the refractor pair. And my apparatus is further capable of reducing the intensity of one of these misregistered image elements relative to the other, maintaining a brilliant clarity in the compound image, by for instance, taking the pictures with the aperture pair 17$^R$ and 17$^L$ in position at the objective.

At times I position OF$^R$ and OF$^L$ at unequal angles of obliqueness of relative to the plane of the objective. Arranged in such combination, and with proper focusing, the image of an object can be brought, at the reception area, into substantially uniform register of its component elements locally on one side of the object image contour while there is an offset shadow introduced locally at the laterally opposite side of the image contour.

Furthermore it will be observed that since the rearward refractor elements are replaceable OF$^R$ may be made slightly thicker than OF$^L$, or the reverse. Operating the device in such combination I produce an image of an object in pluralfocal structure having a multiple contour formation.

Other combinations and arrangements will be apparent, in the light of these disclosures, to those skilled in the art.

My relief lens system herein described, is seen to be a new combination and arrangement of constituent elements producing a new and beneficial result by its action effecting a fractional intensity division of the structure of the optical image, and the reassembly of component fractional parts of the image in laterally offset registration with their counterparts, the picture still being of continuous structure and uninterrupted coverage on the image reception area.

And when to the lateral offset registration of such local images I add, as described herein, diverse focii characteristics, and a differential intensity ratio between individual portions of the image, I create in fact an illusion of relief in the image so novel as to be a distinctly new type of image in harmonious plastic structure.

It will be observed that in all instances of use, each effective refractor is positioned substantially, and preferably completely, transverse a vertically complete section of the effective area of the objective in substantially vertical direction, and across a material, but substantially incomplete, portion of the effective area of the objective in horizontal direction. This direction of arrangement is essential to the most perfect result in the relief picture, since it produces the necessary local parallax between constitutent superposed image elements to be restrictively in a lateral direction. Not only does this serve to make the finished picture more sharp and clear, but more natural, as well. The parallax observed in a scene by the human eyes in binocular vision is restrictively in lateral direction, because the eyes are laterally positioned one to the other. And my arrangement of the oblique refractor transverse its portion of the objective in direction restrictively vertical reproduces natural relief more accurately than any other direction of positioning can.

The back refractors may be arranged each rearward of a portion lesser than half the lens area, thus transmitting a normal picture through the lens center added to the pair of pictures through opposite, right and left positioned sides of the lens and the zonal aperture. Other effects may be obtained by positioning the refractor, such as OF$^R$, between the lens elements.

I have illustrated another desirable form of mounting of refractor, OF$^{R2}$, in Fig. 5. The relief lens of Fig. 5 is of design and construction comprised of the optical lens element 1$^a$ and its normal mount, and faced by a horizontally directed zonal aperture. Illustration Fig. 5, shows the arrangement in rear view. Immediately back of the lens element, 1$^a$, is mounted refractor OF$^{R2}$, having plane opposite parallel faces, and opaque edges. It is mounted as an auxiliary lens element, precisely behind an incomplete number out of the laterally positioned sight viewpoint stations, L, CL, C, CR, and R. For illustration I have mounted the refractor OF$^{R2}$, exactly facing sight viewpoint stations CR and R, and no more. The refractor is fixed in vertical position transverse, the objective, while in lateral position is angularly adjustable, being hung top and bottom on pivots 30 and 30', which pivots are inserted in ears 30a and 30a', respectively attached to the lens mount 1$^{a2}$. The refractor swings on the pivots either right or left or to any intermediary position, and is capable of being locked in selected position of angle relative to the plane of the objective and mount, 1$^{a2}$, by screws 31 and 32, which are positioned oppositely in the ends of refractor OF$^{R2}$, and turn in threads to press against the side of lens mount 1$^{a2}$. Now, by loosening screw 31 and tightening screw 30 to press the right side of OF$^{R2}$ farther out from the lens mount the refractor is swung on the pivot into greater or lesser degree of obliqueness as desired. This causes the rays passed through viewpoint stations CR and R, and those rays only, to be shifted relatively farther to the left, for instance, and superpose their respective image elements on the reception area at a slightly changed lateral position relative to the complementary image elements transmitted through L, CL, and C.

It will be observed that I have illustrated refractor OF$^{R2}$ as in combination also with an aperture stop of the type of element 14, whereby the refractor is in arrangement transverse a section of the aperture in vertical direction, while in longitudinal direction being not transverse but merely rearward of a material but substantially incomplete portion.

Another alternative mounting of a rearward refractor is shown in Fig. 6. This construction comprises a strip refractor OF$^C$ positioned in vertical direction across the center of the lens. The refractor OF$^C$ is provided with adjustment means of screws 31 and 32 and pinions 30a and 30a' and ears 30 and 30', similar to the adjustment means just indicated for refractor OF$^{R2}$ of Fig. 5. Through such means the refractor OF$^C$ is capable of being fixed in adjustment at an oblique angle right or left relative to the lens element, 1a, or at a position parallel to the plane of the element 1a.

Such construction and optical element combination acts on the light rays and image element characteristics to produce a center viewpoint picture in a shorter focal length, and superposed with right viewpoint and left viewpoint pictures in relatively longer focal length. This yields a three viewpoint picture in two dissimilar focii.

Now on occasion, particularly when there are multiple numbers of intermediary objects in space between the foreground object of the scene and the background object of the scene, it is desirable to compound the images elements in multiple focii, corresponding to multiple distances in space. I therefore provide an optical system combination in multiple focus by assembling the rearward refractor element in a form of laminated step structure, such as appears in Fig. 6a. This shows a cross section of a double step refractor, which is essentially a single refractor of the previously indicated type, to which has been added an additional refractor of the same type but having a materially lesser width. The double step refractor is therefore in single thickness at its sides OF$^S$ and OF$^{S1}$, and in double thickness at its center portion OF$^D$. The edges 33 are opaqued. The action of the refractor areas OF$^S$ and OF$^{S1}$ is similar to the action of the refractors as previously stated. The action of the refractor area OF$^D$ is similar to action of the areas OF$^S$ and OF$^{S1}$ but in double the amount. The step refractor is thus an optical element usable with the present or any other lens system, as an auxiliary giving multiple focii characteristic to the device.

Now, while I have shown the relief lens system as provided preferably with an aperture carrier element 2 bearing a plurality of interchangeable apertures it is possible to dispense with the aperture carrier disk 2 and substitute an aperture control system having side slides, such as illustrated in Fig. 7.

In such construction the lens element 1 is masked at its center, rearward by an opaque strip 34 extending in vertical direction transverse its area between the top and bottom of the lens housing. In the same plane of the mask strip 34 and positioned respectively to the right and left thereof, are mask slides 35 and 35' attached to swivels 36 and 36' in which turn screws 37 and 37'. The screws turn in threaded bores 38 and 38' fixed in extensions of the housing H by screw handles 39 and 39'. Turning of the screw handle 39, for example, will turn the screw 38 into or out of the bore 38, and move the slide 35 farther in or farther out away from the center mask 34. This necessarily increases or decreases the area of the aperture AR. The screw 37 is calibrated with markings, indicating the amount of light transmitted by the aperture in that position, according to a standard system of aperture stops. In like manner screw 37' controls the area and light transmission action of left aperture AL.

Using this aperture control means of Fig. 7, or any similar slide mechanism, the operator, while inspecting the optical image thrown on the image reception area is able to increase or decrease the proportion of light transmitted by the spaced apertures and to make one picture sufficiently strong to be dominant and clear, and to make the other, and offset, picture of intensity exactly sufficient to mingle with the first picture and produce a pleasing relief shadow, while not sufficiently strong to produce an interference or conscious double image. And is able to determine the desired ratio between the dominant and the recessive picture, when photographing motion pictures for instance, in the light of the "gamma" characteristic of the emulsion of the particular negative being used, as a reception area.

In other instances I effect an additional modification of the device by removing the slide element 35' and substituting therefor a thin refractor of type similar to those previously shown. Such substituted refractor is then capable of adjustment in or out by turning the screw 37, and serves to be an additional means regulating the focii proportions pertaining respectively to diverse focii aspects of the scene in space.

It should be understood that each of the component parts of my optical image system may be compounded with any desired selection of any of the other parts, as shown to be so adjustable.

While I have shown the illustrated and stated combinations as preferred embodiments of my invention, nevertheless the invention may be embodied in other specific forms without departing from the essential characteristics. I desire the present embodiments to be considered in respects as basically illustrative, and not restrictive, and that the invention be interpreted in the light of the appended claims.

I claim:

1. In optical image apparatus the registration system of image elements in plastic contour form respecting a depth plane of a scene in space which comprises an image reception area, an objective, forward positioned means increasing laterally the virtual spread of simultaneously effective sight viewpoints of the scene, and a thin refractor having plane faces, the refractor being positioned, substantially, vertically transverse an incomplete portion of the lateral extent of the objective, the device superposing a plurality of laterally complementary image elements in harmonious plastic structure in a figure at the image reception area.

2. In an optical image system, the combination of: an objective; a single image reception area disposed behind said objective and extending transversely of the optical axis thereof for receiving a real image of an object disposed before said objective; a refractor having plane parallel faces disposed between said objective and said image reception area; and means mounting said refractor in a position extending horizontally across a portion of said objective at an acute angle to said optical axis for laterally displacing the light transmitted through said portion to superimpose a pair of complementary images of said object in horizontally directed mis-registration on said image reception area.

3. In an optical image system, the combination of: an objective; a single image reception area disposed behind said objective and extending transversely of the optical axis thereof for receiving a real image of an object disposed before said objective; a plurality of refractors, each having plane parallel faces disposed between said objective and said image reception area; means mounting each of said refractors in a position extending horizontally across a portion of said objective and for movement about a vertical axis to vary their angular positions relative to said optical axis for laterally displacing the light transmitted through said portion of said objective to superimpose a plurality of complementary images of said object in horizontally directed mis-registration on said image reception area.

4. In an optical image system, the combination of: an objective; a single image reception area disposed behind said objective and extending transversely of the optical axis thereof for receiving a real image of an object disposed before said objective; spreading means disposed before said objective for conducting to said objective light transmitted from said object to laterally spaced sight viewpoints thereof; a refractor having plane parallel faces disposed between said objective and said image reception area and extending across a portion of said objective for intercepting the light transmitted from a part of said spaced sight viewpoints; and means mounting said refractor for pivotal movement to vary its angular disposition relative to said optical axis for laterally displacing the light transmitted through said portion to superimpose a plurality of complementary images of said object in controlled mis-registration on said image reception area.

5. In an optical image system, the combination of: a monocular objective; an image reception area disposed behind said objective and extending transversely of the optical axis thereof and spaced therefrom a distance approximating the focal length of said objective for receiving a real image of an object disposed before said objective; means identifying a plurality of portions of said objective with correspondingly horizontally spaced sight viewpoints; and adjustable means disposed between said objective and said image reception area and cooperating with said objective for controlling the relative positions of each of the images of said object formed by said portions of said objective on said image reception area to shift the same into and out of register.

6. In an optical image system, the combination of: an objective; an image reception area disposed behind said objective and extending transversely of the optical axis thereof for receiving a real image of an object disposed before said objective; a stop defining a narrow elongated aperture disposed closely adjacent the nodal point of said objective to establish a plurality of aligned sight viewpoints spaced from each other; a refractor having plane parallel faces disposed between said objective and said image reception area and extending across a portion of said aperture; means mounting said refractor for pivotal movement to vary its angular disposition relative to said optical axis for laterally displacing the light transmitted from a part of said sight viewpoints to superimpose a plurality of complementary images on said image reception area.

7. In an optical image system, the combination of: an objective; an image reception area disposed behind said objective and extending transversely of the optical axis thereof for receiving a real image of an object disposed before said objective; a stop defining a pair of spaced apertures of different light transmitting ability disposed closely adjacent the nodal point of said objective to identify spaced portions of said objective with spaced viewpoints of said object for superimposing on said image reception area in differing intensities the images from said spaced viewpoints of said object; a refractor having plane parallel faces disposed between said objective and said image reception area and extending across one of said apertures; means mounting said refractor for pivotal movement to vary the angular disposition thereof relative to said optical axis for laterally displacing the light transmitted through one of said apertures to superimpose a pair of complementary images of said object in controlled mis-registration on said image reception area.

8. In an optical image system, the combination of: an objective; an image reception area disposed behind said objective and extending transversely of the optical axis thereof for receiving a real image of an object disposed before said objective; a refractor having plane parallel faces disposed before said objective and extending across a portion of the area thereof at an acute angle to said optical axis for diverting through said objective light from said object transmitted to one side of said objective; and means disposed between said objective and said image reception area for intercepting the light passing through said portion to shift the image formed thereby into registration with the image formed by the balance of said objective area.

9. In an optical image system, the combination of: an objective; a single image reception area disposed behind said objective and extending transversely of the optical axis thereof for receiving a real image of an object disposed before said objective; a refractor including a plurality of sections of different thicknesses, each having plane parallel faces; and means mounting said refractor between said objective and said image reception area in a position disposing said refractor across a portion of said objective at an acute angle to said optical axis for laterally displacing the light transmitted therethrough by differing amounts to superimpose a plurality of complementary images in laterally directed mis-registration on said image reception area.

10. In an optical image system, the combination of: a pair of objective portions of different focal lengths disposed laterally of each other and having a common optical axis; stop means defining a pair of light-transmitting apertures, one for each of said objective portions, one of said apertures having a greater light transmitting ability than the other; and a single image reception area disposed behind said pair of objective portions and extending transversely of said optical axis and spaced from said objective portions a distance approximating the focal lengths thereof for receiving from one of said objective portions an image in one intensity of a plurality of objects disposed before said objective portions at different distances therefrom, whereby the image of one of said objects may be in critical focus and the images of the remaining said objects may be in less critical focus, and for receiving from the other of said objective portions another image of said objects superimposed upon said first image and in different intensity, whereby the image of a different one of said objects may be in critical focus and the images of the remaining said objects may be in less critical focus.

11. In an optical image system, the combination of: an objective including an objective element; a single image reception area disposed behind said objective element and extending transversely of the optical axis thereof and spaced therefrom a distance approximating the focal length of said objective for receiving real images of objects disposed before said objective element in relative foreground and background positions; a plurality of refractors having plane parallel faces disposed in lateral spaced relation to each other and between said objective element and said image reception area for refracting the light transmitted therethrough, whereby light passing solely through said object element forms on said image reception area elemental images of each object superimposed upon elemental images of said objects formed by light passing through said objective element and said refractors, the elemental images of each of said objects including a critically focused image and less sharply focused images; and means mounting said refractors in positions extending substantially vertically across portions only of said objective element and in lateral symmetry relative to a vertical center line thereof, whereby the intensities of said critically focused images relative to said less sharply focused images of each object is maintained irrespective of the lateral positioning of said object relative to said optical axis.

12. In an optical image system, the combination of: an objective including an objective element; a single image reception area disposed behind said objective element and extending transversely of the optical axis thereof and spaced therefrom a distance approximating the focal length of said objective; a refractor having plane parallel faces and a width less than the effective width of said objective element disposed between said objective element and said image reception area; and means mounting said refractor in a position extending substantially vertically across an intermediate portion only of said objective element.

13. In an optical image system, the combination of: an objective including an objective element; a single image reception area disposed behind said objective element and extending transversely of the optical axis thereof and spaced therefrom a distance approximating the focal length of said objective for receiving real images of objects disposed before said objective element in relative foreground and background positions, a refractor having plane parallel faces disposed between said objective element and said image reception area for refracting the light transmitted therethrough; and means mounting said refractor in a position extending substantially vertically across a portion only of said objective element and at substantially right angles to said optical axis, whereby light passing solely through said objective element forms on said image reception area elemental images of each object superimposed upon elemental images of said objects formed by light passing through said objective element and said refractor, the elemental images of each of said objects including a critically focused image and less sharply focused images.

14. In an optical image system, the combination of: an objective element; an image reception area disposed behind said objective element and extending transversely of the optical axis thereof for receiving real images of each of a plurality of objects disposed before said objective element and at different distances therefrom; a stop defining a narrow elongated aperture disposed closely adjacent said objective element to establish a plurality of aligned sight viewpoints spaced from each other; a refractor having plane parallel faces disposed between said objective element and said image reception area for refracting the light transmitted therethrough, whereby light passing solely through said objective element forms on said image reception area elemental images of each object superimposed upon elemental images of said objects formed by light passing through said objective element and said refractor, the elemental images of each of said objects including a critically focused image and less sharply focused images; and means mounting said refractor in a position extending substantially vertically across a central portion of said objective element substantially at right angles to said optical axis, whereby the intensities of said critically focused images relative to said less sharply focused images of each object is maintained irrespective of the lateral positioning of said object relative to said optical axis.

15. In an optical image system, the combination of: an objective element; an image reception area disposed behind said objective element and extending transversely of the optical axis thereof for receiving real images of each of a plurality of objects disposed before said objective element and at different distances therefrom; a stop defining a narrow elongated aperture disposed closely adjacent said objective element to establish a plurality of aligned sight viewpoints spaced from each other; a pair of refractors disposed between said objective element and said image reception area, each of said refractors having plane parallel faces for refracting the light transmitted therethrough, whereby light passing solely through said objective element forms on said image reception area elemental images of each object superimposed upon elemental images of said objects formed by light passing through said objective element and said refractors, the elemental images of each of said objects including a critically focused image and less sharply focused images; and means mounting said refractors in positions extending substantially horizontally across opposite edge portions of said objective element and at substantially right angles to said optical axis, whereby the intensities of said critically focused images relative to said less sharply focused images of each object is maintained irrespective of the lateral positioning of said object relative to said optical axis.

16. In an optical image system, the combination of: an objective; an image reception area disposed behind said objective and extending transversely of the optical axis thereof for receiving real images of objects disposed before said objective; a stop defining a pair of spaced apertures of different light transmitting ability disposed closely adjacent the nodal point of said objective to identify spaced portions of said objective with spaced viewpoints of said objects; and means cooperating with one of said apertures for altering the normal focal length of that portion of said objective associated with said aperture to a value different from the focal length of that portion of said objective associated with the other aperture, whereby images from said spaced viewpoints are superimposed on said image reception area in differing intensities and images of each of a plurality of objects disposed before said objective and at different distances therefrom include superimposed critically focused and less sharply focused image components.

17. In an optical image system, the combination of: a stop defining a pair of spaced apertures of different light transmitting ability; an image reception area disposed behind said apertures for receiving light transmitted therethrough; and an objective disposed with its nodal point closely adjacent said apertures, said objective having a portion of one focal length associated with one of said apertures and a portion of different focal length associated with the other of said apertures for forming real images on said image reception area, whereby said images include critically focused images of each of a plurality of objects disposed at different distances before said objective.

18. In an optical image system, the combination of: an objective element; a single image reception area disposed behind said objective element and extending transversely of the optical axis thereof for receiving real images of each of a plurality of objects disposed before said objective and at different distances therefrom; a refractor disposed between said objective and said image reception area having a plurality of sections of different thicknesses, each having plane parallel faces for refracting the light transmitted therethrough, whereby light passing solely through said objective element forms on said image reception area elemental images of each object superimposed upon elemental images of said objects formed by light passing through said objective element and said refractor, the elemental images of each of said objects including a critically focused image and less sharply focused images; and means mounting said refractor in a position extending substantially vertically across a central portion of said objective and at substantially right angles to said optical axis, whereby the intensities of said critically focused images relative to said less sharply focused images of each object is maintained irrespective of the lateral positioning of said object relative to said optical axis.

IVAN MELVILLE TERWILLIGER.